(12) United States Patent
Finerman et al.

(10) Patent No.: US 6,399,710 B1
(45) Date of Patent: Jun. 4, 2002

(54) MODIFICATION OF THERMOLASTIC VULCANIZATES WITH A THERMOPLASTIC RANDOM COPOLYMER OF ETHYLENE

(75) Inventors: Terry M. Finerman, Akron; Maria D. Ellul, Silver Lake Village; Sabet Abdou-Sabet, Akron, all of OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/554,796

(22) PCT Filed: Sep. 18, 1998

(86) PCT No.: PCT/US98/19504

§ 371 Date: Jul. 3, 2000

(87) PCT Pub. No.: WO99/27001

PCT Pub. Date: Jun. 3, 1999

Related U.S. Application Data

(63) Continuation of application No. 08/975,420, filed on Nov. 20, 1997, now abandoned.

(51) Int. Cl.[7] .............................................. C08L 23/02

(52) U.S. Cl. .................. 525/232; 525/193; 525/194; 525/196; 525/197; 525/198; 525/211; 525/237

(58) Field of Search ................................ 525/193, 194, 525/196, 197, 198, 211, 232, 237

(56) References Cited

U.S. PATENT DOCUMENTS

| | | | |
|---|---|---|---|
| 4,088,714 A | 5/1978 | Huff | 260/897 A |
| 4,130,534 A | 12/1978 | Coran et al. | 260/33.6 AQ |
| 4,143,099 A | 3/1979 | Duncan | 260/897 A |
| 4,311,628 A | 1/1982 | Abdou-Sabet et al. | 260/33.6 AQ |
| 5,073,597 A | 12/1991 | Puydak et al. | 525/193 |
| 5,656,693 A | 8/1997 | Ellul et al. | 525/171 |
| 5,747,592 A | 5/1998 | Huff et al. | 525/191 |
| 5,869,563 A | 2/1999 | Kawasaki et al. | 524/525 |

FOREIGN PATENT DOCUMENTS

| | | |
|---|---|---|
| EP | 0 143 131 A1 | 6/1985 |
| EP | 0 461 887 A1 | 12/1991 |
| EP | 0 753 538 B1 | 1/1997 |
| FR | 2 742 441 | 6/1997 |
| JP | 3-234744 | 10/1991 |

OTHER PUBLICATIONS

Yu and Wagner, "Polyolefin Modification with Exact™ Plastomers," SPE RETEC Polyolefins VIII Conference, Feb. 1993.

Flynn, "Differential Scanning Colorimetry" in Encyclopedia of Polymer Science and Engineering, pp. 702–707, Supp. vol., 1989.

*Primary Examiner*—Bernard Lipman
(74) *Attorney, Agent, or Firm*—William A. Skinner; Samuel B. Laferty

(57) ABSTRACT

Random thermoplastic ethylene copolymers can be used to increase the elongation to break and toughness of thermoplastic vulcanizates. Polypropylene is a preferred thermoplastic phase. The rubber can be olefinic rubbers. Random thermoplastic ethylene copolymers are different from Ziegler-Natta ethylene copolymers as the compositional heterogeneity of the copolymer is greater with Ziegler-Natta copolymers. This difference results in substantial differences in properties (elongation to break and toughness) between thermoplastic vulcanizates modified with random thermoplastic ethylene and those modified with Ziegler-Natta ethylene copolymers. An increase in elongation to break results in greater extensibility in the articles made from a thermoplastic vulcanizate.

13 Claims, No Drawings

MODIFICATION OF THERMOLASTIC VULCANIZATES WITH A THERMOPLASTIC RANDOM COPOLYMER OF ETHYLENE

This application is a continuation of Ser. No. 08/975,420 filed Nov. 20, 1997, abandoned.

FIELD OF INVENTION

Thermoplastic random copolymers of ethylene can be used to increase the elongation to break and toughness of thermoplastic vulcanizates made from a thermoplastic polypropylene phase and a crosslinkable rubber. The thermoplastic random copolymers of ethylene are available from several suppliers as polymers from single site catalyst, often referred to as metallocene catalyst polymerized polymers. They differ from other ethylene copolymers in that the comonomer is rather uniformly distributed in substantially all of the polymer chains, while in prior art thermoplastic ethylene copolymers the comonomer was disproportionately increased in a portion of the polymer chains and the comonomer was disproportionately reduced in a portion of the polymer chains resulting in a broad compositional distribution for the polymer.

BACKGROUND OF INVENTION

Thermoplastic vulcanizates from polypropylene and a rubber have gained wide acceptance as a substitute for thermoset rubbers in a variety of applications. It would be desirable for many of these applications to increase the elongation to break of said thermoplastic vulcanizates and to increase the total toughness (as measured by the area under the stress strain curve) when a thermoplastic vulcanizate is measured in a tensile test.

Polyethylene and copolymers of polyethylene are very interesting polymers because they can have both amorphous regions and crystalline regions. Amorphous regions of polyethylene are rubbery at room temperatures having a glass transition temperature well below 0° C. Crystalline regions of polyethylene are more rigid materials having a melting point generally between about 80° C. and 135° C. depending on the characteristics of the crystals and the density of the polyethylene. The crystalline regions of polyethylene are more dense, i.e., have higher densities than the amorphous region of the polymer. High density polyethylene has higher relative proportions of crystalline polymer versus amorphous polymer than its low-density counterparts. Generally polymer chain branching and the incorporation of comonomers decrease the crystallinity in polyethylene due to the fact that the crystal structure cannot accommodate many comonomers or large chain branches. The amorphous regions of semi-crystalline polyethylene adds to the toughness of the material as it can undergo elastic and plastic deformation to accommodate stresses or strains thus avoiding fracture of the crystalline regions.

Ethylene-propylene-diene polymers (EPDM) also known as ethylene-propylene-diene-polymethylene rubber with weight ratios of ethylene to propylene of from 25:75 to about 75:25 have sufficient incorporation of both ethylene and propylene in the polymer chain such that these materials are rubbery at room temperature rather than solid, such as polyethylene or polypropylene.

Copolymers from polyethylene have been made in the past with catalysts other than single site catalysts. Various polymerization techniques have been used so that a specified portion of comonomer is present in the copolymer. However, few polymerization catalysts or polymerization systems are known which truly randomly polymerize ethylene with comonomers into a thermoplastic copolymer. Linear low density polyethylene involves the polymerization with an ethylene feed and a second olefin feed, generally 4–8 carbon atoms, keeping a relatively constant feed ratio. The catalysts have several different active sites such that some sites incorporate the second olefin more efficiently than others. The different sites also can result in different polymer chain lengths. This results in a broad molecular weight distribution and a broad compositional distribution in the resulting polymer. Another method of making low-density polyethylene involves using polymerization conditions that encourage branching in the polyethylene chain, said branching disrupting the crystallinity of the polyethylene and causing a reduced amount of crystallinity and consequently a reduced density.

SUMMARY OF INVENTION

Thermoplastic vulcanizates from polypropylene, a rubber, and a thermoplastic random copolymer of ethylene can be prepared by blending a thermoplastic random copolymer of ethylene with the components of a thermoplastic vulcanizate or by mixing a thermoplastic random copolymer of ethylene with a preformed thermoplastic vulcanizate from polypropylene and a rubber. The thermoplastic random copolymers of ethylene are commercially available as a result of the development of single site catalysts including metallocene catalysts. The thermoplastic random copolymers of ethylene currently have rather narrow molecular weight distributions and rather narrow compositional distributions. The average comonomer concentration is from about 5 to about 30 weight percent based on the weight of the ethylene copolymer. As is known to the art, thermoplastic vulcanizates usually comprise from about 15 to about 75 parts of the thermoplastic phase and from about 25 to about 85 parts by weight of the rubber phase. They can further comprise various amounts of curatives, plasticizers, fillers, etc. The thermoplastic random copolymer of ethylene is desirably present in amounts of from about 5 to about 150 parts per 100 parts of polypropylene in the thermoplastic vulcanizate. The rubber can be any hydrocarbon rubber such as butyl rubbers, halobutyl rubbers, halogenated (e.g., brominated) copolymers of paramethyl styrene and iso-butylene, EPDM rubber, and natural rubber or diene-based homo or copolymer rubber.

DETAILED DESCRIPTION OF THE INVENTION

The thermoplastic random copolymer of ethylene used to modify thermoplastic vulcanizates in this invention is different from other ethylene copolymers used in thermoplastic vulcanizates in the past: it is much more random in terms of the incorporation of comonomer(s) in the copolymer. In the past, copolymers with more than 2, 5, or 10 weight percent comonomer were either rubbers or were a physical blend of copolymers low in ethylene repeat units and other copolymers significantly richer in ethylene repeat units, which blend would have a relative weight percent of comonomer and ethylene cited in the product literature. The thermoplastic random copolymer of ethylene used in this invention can have very narrow molecular weight distributions (Mw/Mn) of from about 1.5 or 1.7 to 3.5, more desirably from about 1.8 to about 3.0 and preferably from about 1.5 or 1.9 to 2.8 due to the single site catalyst, also referred to as metallocene catalyst, currently used to prepare such polymers. This disclosure is not limited to thermoplastic random copolymers of ethylene made with metallocene catalysts, but rather uses those commercially available polymers as illustrative of a polymerization method capable of making random copolymers operable in this disclosure. Further, the molecular weight distributions are recited as a method of identifying these polymers, but are not a requirement for operativeness of the copolymer in a thermoplastic vulcanizate.

The thermoplastic random copolymer of ethylene can have varying amounts of one or more comonomers therein. In the examples, the thermoplastic random copolymer of ethylene is often referred to as a plastomer indicating that it has some properties of both a plastic and an elastomer. Desirably the amount of repeat units from one or more comonomers is from about 5, 10, 15 or 20 to about 30 or 35 weight percent of the thermoplastic random copolymer of ethylene. More desirably, the amount of repeat units from said one or more comonomers is from about 10 to about 25 weight percent. The amount of ethylene in said thermoplastic random copolymer of ethylene is desirably from about 65 or 70 to about 80, 85, 90 or 95 weight percent, and more desirably from about 65, 70 or 75 to about 80, 85 or 90 weight percent. The one or more comonomers can be any ethylenically unsaturated compound copolymerizable with ethylene using a single site catalyst. The one or more ethylenically unsaturated monomers desirably have from about 3 or 4 to about 12 carbon atoms, more desirably from about 3 or 4 to about 8 carbon atoms, and are preferably monoolefins with the specified range of carbon atoms. Examples of such comonomers include alkylacrylates such as ethylacrylate, butylacrylate: monoolefins such as propylene or octene, etc.

The thermoplastic random copolymers of ethylene desirably have densities of from about 0.85 or 0.86 to about 0.91, 0.92 or 0.93 grams per cubic centimeter, more desirably from about 0.86 or 0.87 to about 0.90, 0.91 or 0.92 grams per cubic centimeter. As the polymerization systems. e.g., the single site catalyst polymerization system which includes metallocene catalysts readily incorporate comonomers with the ethylene in the thermoplastic random copolymer of ethylene, the comonomers are randomly distributed within the individual polymer chains and the individual polymer chains are rather uniform in comonomer composition. Due to the uniform distribution of repeat units from the comonomers within the polymer chains and the uniformity of comonomer distribution within the polymer, as opposed to prior art polyethylene copolymers, the thermoplastic random copolymers of ethylene tend to have rather narrow melting temperature ranges by test methods such as dynamic scanning calorimetry (DSC) as compared to prior art ethylene copolymers. This is due to the fact that the thermoplastic random copolymers of ethylene have a very uniform crystalline structure and thus melt within a narrow temperature range. The random copolymers of ethylene vary from most other ethylene copolymers in that the melting peak in the dynamic scanning calorimetry of the random copolymers decreases as the comonomer content increases. The peak represents the largest amount of endothermic crystal melting at a single temperature. Therefore, desirably the random copolymer of ethylene has a peak melting temperature of less than about 120° C. more desirably from about 50 to about 120° C. still more desirably from about 55, 60, or 65 to about 105 or 110° C. and preferably from about 55, 60 or 65 to about 90, 95 or 100° C. Prior art ethylene copolymers melt over a broader temperature range because they have a broader range of copolymer compositions.

The thermoplastic random copolymer of ethylene can be incorporated into the components used to form a thermoplastic vulcanizate (TPV) or blended with a TPV composition prior to vulcanization of the rubber component, or added after said vulcanization. The physical properties of the resulting blend may or may not vary depending upon whether the thermoplastic random copolymer of ethylene was added prior to or subsequent to vulcanization of the rubber phase. The thermoplastic random copolymer of ethylene can be considered a supplement to the polypropylene of the thermoplastic vulcanizate or can be considered to be substituted on a weight basis for the polypropylene in a thermoplastic vulcanizate. When the random copolymer is added prior to vulcanization, it is anticipated that a majority of the thermoplastic random copolymers of ethylene are in the thermoplastic phase of the resulting thermoplastic vulcanizate, although it may be disproportionately present at the interface between the rubber phase and the thermoplastic phase. Since the melting temperature of the crystalline portion of the thermoplastic random copolymer of ethylene is lower than that of the semi-crystalline polypropylene, it is readily melt-blendable with the thermoplastic vulcanizate or the components thereof at the normal processing/mixing temperatures for the thermoplastic vulcanizate.

The thermoplastic random copolymer of ethylene is desirably present in amounts from about 5 to about 150 parts per 100 parts of polypropylene in the thermoplastic vulcanizate, more desirably in amounts from about 10 to about 120 parts per 100 parts of polypropylene, still more desirably from about 10 or 25 to about 100 parts per 100 parts by weight of polypropylene, and preferably from about 25 to about 80 parts by weight per 100 parts by weight of polypropylene. Thus the thermoplastic random copolymer of ethylene may be present in amounts from about 20 to about 60 weight percent of the thermoplastic phase of the thermoplastic vulcanizate. Since the thermoplastic phase of the thermoplastic vulcanizate can be from about 15 to about 75 percent of the blend of the thermoplastic and rubber phase (without fillers, oils, etc.), the percentage of thermoplastic random copolymer of ethylene based upon the total weight of the thermoplastic vulcanizate can range from 1 or 2 to about 40 or 50 weight percent based upon either the combined weight of the thermoplastic polypropylene and rubber components (without fillers, oils etc.) or the weight of the thermoplastic vulcanizate.

The major portion of polymers in the thermoplastic vulcanizate are the semi-crystal line polypropylene: the thermoplastic random copolymer of ethylene, and a crosslinkable rubber. Examples of semi-crystalline polypropylene are polypropylene, its copolymers and mixtures thereof.

The rubber may be a polyolefin such as EPDM rubber which, because of the random nature of its repeat structure or side groups, tends not to crystallize. Examples of the rubber include EPDM rubber, butyl rubber, halobutyl rubber, halogenated (e.g. brominated) copolymer of p-alkylstyrene and an isomonoolefin of from 4 to 7 carbon atoms (e.g. isobutylene), natural rubber, homo or copolymers of at least one diene monomer, or combinations thereof. Minor amounts of other polymers may be added to modify flow properties, such as fillers or diluents, or as additives, such as polymeric antioxidants. Non-polymeric materials such as oils, fillers, diluents and additives (discussed in a later paragraph) may be present in large amounts. Amounts of most of the components to the blend will be specified either 1) per 100 parts by weight of the blend of the semi-crystalline polypropylene and the rubber or 2) per 100 parts by weight of rubber.

The semi-crystalline polypropylene is desirably from about 6 to about 85 weight percent, more desirably from about 7 to about 75, and preferably from about 8 to about 60 weight percent of the thermoplastic vulcanizate. Desirably the rubber is from about 5 to about 70, more desirably about 10 to about 50 and preferably from about 15 to 45 weight percent of the thermoplastic vulcanizate. Desirably the other conventional components to TPV, e.g. fillers, oils, curatives, processing aids, etc., are from about 0, 1, 2, or 10 to about 87, 88 or 89 weight percent of the TPV, more desirably from about 0, 1, 2, or 15 to about 81, 82 or 83 and preferably from about 0, 1, 2, or 25 to about 75, 76 or 79 weight percent.

The semi-crystalline polypropylene is desirably from about 15 to about 80 parts by weight, more desirably from about 25 to about 75 parts by weight, and preferably from about 25 to about 50 parts by weight per 100 parts of the blend of semi-crystalline polypropylene and the unsaturated rubber. The rubber is desirably from about 20 to about 85 parts by weight, more desirably from about 25 to about 75 parts by weight and preferably from about 50 to about 75 parts by weight per 100 parts by weight of said blend. If the amount of semi-crystalline polypropylene is based on the amount of rubber, it is desirably from about 17.5 to about 320 parts by weight, more desirably from about 33 to about 300 parts and preferably from about 313 to about 200 parts by weight per 100 parts by weight of the rubber.

The terms "blend" and "thermoplastic vulcanizate" used herein mean a mixture ranging from small particles of crosslinked rubber well dispersed in a semi-crystalline polypropylene matrix to co-continuous phases of the semi-crystalline polypropylene and a partially to fully crosslinked rubber or combinations thereof. The term "thermoplastic vulcanizate" indicates the rubber phase is at least partially vulcanized (crosslinked).

The term "thermoplastic vulcanizate" refers to compositions that may possess the properties of a thermoset elastomer and are reprocessable in an internal mixer. Upon reaching temperatures above the softening point or melting point of the semi-crystalline polypropylene phase, they can form continuous sheets and/or molded articles with what visually appears to accomplish complete knitting or fusion of the thermoplastic vulcanizate under conventional molding or shaping conditions for thermoplastics.

Subsequent to dynamic vulcanization (curing) of the rubber phase of the thermoplastic vulcanizate, desirably less than 5 weight percent of the rubber is extractable from the specimen of the thermoplastic vulcanizate in boiling xylene. Techniques for determining extractable rubber as set forth in U.S. Pat. No. 4,311,628, are herein incorporated by reference.

The semi-crystalline polypropylene comprises semi-crystalline thermoplastic polymers from the polymerization of monoolefin monomers (e.g. 2 to 10 carbon atoms) by a high pressure, low pressure, or intermediate pressure process: or by Ziegler-Natta catalysts, or by metallocene catalysts. It may have any tacticity (e.g. isotactic and xyndiotactic) or be a copolymer such as impact modified polypropylene or a random polypropylene copolymer. Desirably the monoolefin monomers converted to repeat units are at least 80, 85 or 93 percent monoolefins of the formula $CH_2=C(CH_2)-H$. The polypropylene can be a homopolymer as well as a reactor copolymer polypropylene. Desirably it has a melting temperature peak of at least 120° C.

The rubber can be any rubber that can react and be crosslinked under crosslinking conditions. These rubbers can include natural rubber, EPDM rubber, butyl rubber, halobutyl rubber, halogenated (e.g. brominated) copolymers of p-alkylstyrene and an isomonoolefin, homo or copolymers from at least one conjugated diene, or combinations thereof, EPDM, butyl and halobutyl rubbers are referred to as rubbers low in residual unsaturation and are preferred when the vulcanizate needs good thermal stability or oxidative stability. The rubbers low in residual unsaturation desirably have less than 10 weight percent repeat units having unsaturation. Desirably excluded from rubbers are acrylate rubber and epichlorohydrin rubber. For the purpose of this invention, copolymers will be used to define polymers from two or more monomers, and polymers can have repeat units from one or more different monomers.

The rubber is desirably an olefin rubber such as EPDM-type rubber. EPDM-type rubbers are generally terpolymers derived from the polymerization of at least two different monoolefin monomers having from 2 to 10 carbon atoms, preferably 2 to 4 carbon atoms, and at least one polyunsaturated olefin having from 5 to 20 carbon atoms. Said monoolefins desirably have the formula $CH_2=CH-R$ where R is H or an alkyl of 1–12 carbon atoms and are preferably ethylene and propylene. Desirably the repeat units from at least two monoolefins (and preferably from ethylene and propylene) are present in the polymer in weight ratios of 25:75 to 75:25 (ethylene:propylene) and constitute from about 90 to about 99.6 weight percent of the polymer. The polyunsaturated olefin can be a straight chained, branched, cyclic, bridged ring, bicyclic, fused ring bicyclic compound, etc., and preferably is a nonconjugated diene. Desirably repeat units from the nonconjugated polyunsaturated olefin is from about 0.4 to about 10 weight percent of the rubber.

The rubber can be a butyl rubber, halobutyl rubber, or a halogenated (e.g. brominated) copolymer of p-alkylstyrene and an isomonoolefin of 4 to 7 carbon atoms. "Butyl rubber" is defined a polymer predominantly comprised of repeat units from isobutylene but including a few repeat units of a monomer which provides sites for crosslinking. The monomers which provide sites for crosslinking can be a polyunsaturated monomer such as a conjugated diene or divinyl benzene. Desirably from about 90 to about 99.5 weight percent of the butyl rubber are repeat units derived from the polymerization of iso-butylene, and from about 0.5 to about 10 weight percent of the repeat units are from at least one polyunsaturated monomer having from 4 to 12 carbon atoms. Preferably the polyunsaturated monomer is isoprene or divinylbenzene. The polymer may be halogenated to further enhance reactivity in crosslinking. Preferably the halogen is present in amounts from about 0.1 to about 10 weight percent, more preferably about 0.5 to about 3.0 weight percent based upon the weight of the halogenated polymer; preferably the halogen is chlorine or bromine. The brominated copolymer of p-alkylstyrene, having from about 9 to 12 carbon atoms, and an isomonoolefin, having from 4 to 7 carbon atoms, desirably has from about 88 to about 99 weight percent isomonoolefin, more desirably from about 92 to about 98 weight percent, and from about 1 to about 12 weight percent p-alkylstyrene, more desirably from about 2 to about 8 weight percent based upon the weight of the copolymer before halogenation. Desirably the alkylstyrene is p-methylstyrene and the isomonoolefin is isobutylene. Desirably the percent bromine is from about 2 to about 8, more desirably from about 3 to about 8, and preferably from about 5 to about 7.5 weight percent based on the weight of the halogenated copolymer. The halogenated copolymer is a complementary amount, i.e., from about 92 to about 98, more desirably from about 92 to about 97, and preferably from about 92.5 to about 95 weight percent. These polymers are commercially available from Exxon Chemical Co.

Other rubber such as natural rubber or homo or copolymers from at least one conjugated diene can be used in the dynamic vulcanizate. These rubbers are higher in unsaturation than EPDM rubber and butyl rubber. The natural rubber and said homo or copolymers of a diene can optionally be partially hydrogenated to increase thermal and oxidative stability. The synthetic rubber can be nonpolar or polar depending on the comonomers. Desirably the homo or copolymers of a diene have at least 50 weight percent repeat units from at least one conjugated diene monomer having from 4 to 8 carbon atoms. Comonomers may be used and include vinyl aromatic monomer(s) having from 8 to 12 carbon atoms and acrylonitrile or alkyl-substituted acrylonitrile monomer(s) having from 3 to 8 carbon atoms. Other comonomers desirably used include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available.

The thermoplastic vulcanizates of this disclosure are generally prepared by melt-mixing the semi-crystalline polyolefin(s) (e.g. polypropylene), the rubber, and other ingredients (filler, plasticizer, lubricant, stabilizer, etc.) in a mixer heated to above the melting temperature of the semi-crystalline polypropylene. The optional fillers, plasticizers, additives etc., can be added at this stage or later. After sufficient molten-state mixing to form a well mixed blend, vulcanizing agents (also known as curatives or crosslinkers) are generally added. In some embodiments it is preferred to add the vulcanizing agent in solution with a liquid, for example rubber processing oil, or in a masterbatch which is compatible with the other components. It is convenient to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete. The random thermoplastic copolymer(s) of ethylene can be added before during, or after vulcanization. After discharge from the mixer, the blend containing vulcanized rubber and the thermoplastic can be milled, chopped, extruded, pelletized. injection-molded, or processed by any other desirable technique. It is usually desirable to allow the fillers and a portion of any plasticizer to distribute themselves in the rubber or semi-crystalline polypropylene phase before the rubber phase or phases are crosslinked. Crosslinking (vulcanization) of the rubber can occur in a few minutes or less depending on the mix temperature, shear rate, and activators present for the curative. Suitable curing temperatures include from about 120° C. or 150° C. for a semi-crystalline polypropylene phase to about 250° C., more preferred temperatures are from about 150° C. or 170° C. to about 225° C. or 250° C. The mixing equipment can include Banbury™ mixers, Brabender™ mixers, and certain mixing extruders.

The thermoplastic vulcanizate can include a variety of additives. The additives include particulate fillers such as carbon black, silica, titanium dioxide, colored pigments, clay, zinc oxide, stearic acid, stabilizers, anti-degradants, flame retardants, processing aids, adhesives, tackifiers, plasticizers, wax, discontinuous fibers (such as wood cellulose fibers) and extender oils. When extender oil is used it can be present in amounts from about 5 to about 300 parts by weight per 100 parts by weight of the blend of semi-crystalline polypropylene and rubber. The amount of extender oil (e.g., hydrocarbon oils and ester plasticizers) may also be expressed as from about 30 to 250 parts, and more desirably from about 70 to 200 parts by weight per 100 parts by weight of said rubber. When non-black fillers are used, it is desirable to include a coupling agent to compatibilize the interface between the non-black fillers and polymers. Desirable amounts of carbon black, when present, are from about 5 to about 250 parts by weight per 100 parts by weight of rubber.

Thermoplastic vulcanizate compositions of the invention are useful for making a variety of articles such as tires, hoses, belts, gaskets, moldings and molded parts. They are particularly useful for making articles by extrusion, injection molding, blow molding, and compression molding techniques. They also are useful for modifying thermoplastic resins and in particular polyolefin resins. The compositions can be blended with thermoplastic resins using conventional mixing, equipment making a rubber modified thermoplastic resin. The properties of the modified thermoplastic resin depend upon the amount of thermoplastic vulcanizate composition blended.

The stress-strain properties of the compositions are determined in accordance with the test procedures set forth in ASTM D412. These properties include tension set (TS), ultimate tensile strength (UTS), 50% modulus (M50), 100% modulus (M100), and ultimate elongation at break (UE). The tear strength is measured according to ASTM D623. The hardness is measured according to ASTM D2240, with a 5 second delay using either the Shore A or Shore D scale. Compression set (CS) is determined in accordance with ASTM D-395. Method B, by compressing the sample for 22 hours at 100° C. Oil swell (OS) (percent change in weight) is determined in accordance with the ASTM D-471 by submerging the specimen in IRM 903 oil and unless otherwise specified is for 24 hours at 125±2° C. Especially preferred compositions of the invention are rubbery compositions having tension set values of about 50% or less which compositions meet the definition for rubber as defined by ASTM Standards. V. 28, page 756 (D1566). More preferred compositions are rubbery compositions having a Shore D hardness of 60 or below, or a 100% modulus of 18 MPa or less, or a Young's modulus below 250 MPa.

EXAMPLES

Tables I through XI provide additional experimental data on polyethylenes and thermoplastic random ethylene copolymers blended with either thermoplastic vulcanizates or the precursors to thermoplastic vulcanizates. The ethylene homopolymers and some of the ethylene copolymers which are not truly random when blended with the thermoplastic vulcanizates or their precursors are control examples. The examples of thermoplastic random copolymers of ethylene blended with thermoplastic vulcanizates or their precursors are examples of the invention.

Tables I and II show the composition of several ethylene copolymers and the composition of several thermoplastic vulcanizates used in later tables. Table X also shows several ethylene polymers or copolymers.

The trade name Exact™ is being used by Exxon for some of their metallocene polymerized ethylene copolymers. The trade name Engage™ is being used by DuPont Dow Elastomers. In Table I several experimental polymers (e.g. those with SLP prefixes) from Exxon were used in the experimentation, but similar commercially available ethylene copolymers are currently available under the Exact trade name.

Table III shows the variation in physical properties achieved with varying amounts of four different thermoplastic random ethylene copolymers of ethylene and 1-butene. The Shore A hardness may increase or decrease from the addition of the thermoplastic random ethylene copolymers depending upon the particular thermoplastic random ethylene copolymer used. Tensile strength usually increases alone with ultimate elongation and relative toughness. The oil swell and the compression set at 100° C. typically increase with the addition of thermoplastic random ethylene copolymer. Control samples (with a C suffix) are generally a thermoplastic vulcanizate without a thermoplastic random ethylene copolymer.

Table IV illustrates blends of a thermoplastic vulcanizate and thermoplastic random ethylene copolymers and their physical properties. These copolymers vary from those in Table III in that they are copolymers of ethylene with 1-octene.

Tables V and VI illustrate further blends of ethylene or ethylene copolymers with thermoplastic vulcanizates. In these examples, ultimate elongation increases.

Table III lists several conventional ethylene copolymers used in later tables.

Table VIII illustrates blends of conventional ethylene copolymers and thermoplastic vulcanizates. The elongation to break of the blends and the toughness are generally less than the control without ethylene copolymers. There are increases in elongation and toughness with Vistalon™ 808 and 4709, but they adversely affect other properties such as increasing oil swell.

Table IX shows blends of the precursors of a thermoplastic vulcanizate or a thermoplastic vulcanizate with a thermoplastic random ethylene copolymer. The purpose of this table is to demonstrate that the thermoplastic random ethylene copolymer can be added before or after curing and some changes in the physical properties can be anticipated. Generally if added after cure, it is believed the thermoplastic random ethylene copolymer causes lower final Brabender torque, slightly higher elongation to break and, as a result of the higher elongation, a slightly higher toughness. The oil swell is expected to decrease from adding, the thermoplastic random ethylene copolymer after vulcanization.

Table X shows several additional ethylene polymers or copolymers both within and outside of the definition of the thermoplastic random ethylene copolymer.

Table XI shows the physical properties of blends of a thermoplastic vulcanizate and the ethylene copolymers and thermoplastic random ethylene copolymers. The ultimate elongation increases more dramatically for the thermoplastic random ethylene copolymers than for the other copolymers and homopolymers.

To better illustrate the difference between the thermoplastic random ethylene copolymers and other copolymers of similar total comonomer concentration. Table XII was prepared. The physical properties shown are the ultimate elongation and 100 percent modulus for blends of thermoplastics and the ethylene homopolymers or copolymers. The first and third examples are thermoplastic random ethylene copolymers according to this disclosure. The second and fourth examples are not within the description of a thermoplastic random ethylene copolymer of this disclosure. As can be seen from the data, the ultimate elongation is dramatically better for the first and third examples than for the other examples outside the scope of this disclosure. As can be seen by the 100 percent modulus data, the first and third compositions have lower modulus, i.e., are softer than the second and fourth compositions which are outside the scope of this disclosure.

Table XIII was prepared to illustrate that a TPV using butyl rubber, nitrile rubber or natural rubber instead of EPDM rubber would have improved ultimate elongation and tensile strength when blended with a random ethylene copolymer (plastomer).

TABLE I

Characterization of Metallocene Polymerized Ethylene Copolymers (Plastomers)

| Material | ethylene (wt %) | 1-butene (wt %) | 1-octene (wt %) | Melt Index*** | Density | Tm Peak ° C. |
|---|---|---|---|---|---|---|
| SLP-0609 | 86 | 14 | — | 1.1 | 0.905 | ~100 |
| SLP-0432 | 84.4 | 15.6 | — | 1.4 | 0.895 | ~85 |
| SLP-0566 | 78.3 | 21.7 | — | 0.85 | 0.881 | ~68 |
| SPL-0121 | 77.5 | 22.5 | — | 2.3 | 0.881 | ~68 |
| Exact 4033* | ≈78 | ≈22 | — | 0.8 | 0.880 | ~68 |
| Engage ™ 8100** | ~75 | — | ~25 | 1 | 0.870 | 60 |
| Engage ™ 8150** | ~73 | — | ~27 | 0.5 | 0.868 | 55 |
| Engage ™ 8401** | ~80 | — | ~20 | 30 | 0.885 | 76 |
| Engage ™ 8480** | ~85 | — | ~15 | 1 | 0.902 | 100 |

*Available from Exxon
**Available from DuPont Dow Elastomers
***Melt index is ASTM D-1238 (E)

TABLE II

Thermoplastic Vulcanizates: Polypropylene Concentration and Rubber Type

| Thermoplastic Vulcanizate | Rubber Type | PP Concentration. Wt. % | Rubber Concentration. Wt. % |
|---|---|---|---|
| TPV-1 | EPDM | 13.4% | 28.5 |
| TPV-2 | EPDM | 58.3% | 14.5 |
| TPV-3 | EPDM | 9.4% | 26.7 |
| TPV-4 | Natural | 10.0% | 32 |
| TPV-5 | Nitrile | 15.0% | 48 |
| TPV-6 | Butyl | 16.0% | 42 |

The residual of the thermoplastic vulcanizates being conventional TPV components including oils, fillers, processing aids, curatives, etc.

TABLE III

Physical Properties of a TPV and a Plastomer (random copolymer of ethylene and 1-butene)

|  | 1C | 2 | 3 | 4 | 5 | 6 | 7 | 8 | 9 | 10C |
|---|---|---|---|---|---|---|---|---|---|---|
| TPV-1 | 100.0 g | 100.0 | 100.0 | 100.0 | 100.0 | 100.0 | 100.0 | 100.0 | 100.0 | 100.0 g |
| SLP-0609 |  | 3.4 | 6.7 | 10.0 | 13.4 |  |  |  |  |  |
| SLP-0432 |  |  |  |  |  | 3.4 | 6.7 | 10.0 | 13.4 |  |
| Polypropylene:Plastomer Ratio | 100:0 | 100:25 | 100:50 | 100:75 | 100:100 | 100:25 | 100:50 | 100:75 | 100:100 | 100:0 |
| Plastomer concentration, wt. % | 0.0% | 3.2% | 6.3% | 9.1% | 11.8% | 3.2% | 6.3% | 9.1% | 11.8% | 0.0% |
| Physical Properties, Unaged |  |  |  |  |  |  |  |  |  |  |
| Hardness, Shore A | 59 | 61 | 63 | 64 | 65 | 62 | 62 | 63 | 65 | 61 |
| 50% Modulus, MPa | 1.75 | 1.85 | 1.88 | 2.01 | 2.05 | 1.81 | 1.81 | 1.93 | 1.97 | 1.72 |
| 100% Modulus, MPa | 2.42 | 2.51 | 2.54 | 2.66 | 2.69 | 2.47 | 2.46 | 2.57 | 2.61 | 2.37 |
| Tensile Strength, MPa | 6.07 | 6.38 | 8.08 | 8.82 | 9.50 | 6.51 | 7.93 | 8.89 | 9.44 | 5.61 |
| Ultimate Elongation % | 456 | 474 | 567 | 591 | 621 | 488 | 565 | 610 | 637 | 433 |
| Toughness, MJ/m$^3$ | 16.72 | 18.21 | 25.24 | 28.30 | 30.83 | 18.88 | 24.72 | 28.84 | 31.74 | 14.95 |
| % Tension Set 100% E, 10 min 21° C. | 8.0 | 9.0 | 10.5 | 11.5 | 12.5 | 8.5 | 10.0 | 12.0 | 12.5 | 7.5 |
| % Compression set 22 hrs. @ 100 C. | 26.4 | 28.6 | 29.5 | 30.3 | 31.4 | 28.5 | 28.0 | 28.6 | 28.6 | 25.0 |
| % Compression set 22 hrs. @ 21° C. | 16.5 | 15.9 | 16.1 | 15.8 | 14.9 | 15.8 | 15.8 | 16.1 | 14.4 | 14.6 |
| % Oil Swell, 24 hours, 125° C. | 92.4 | 113.7 | 118.5 | 120.2 | 118.5 | 106. | 120.5 | 116.3 | 108.4 | 96.7 |

|  | 11 | 12 | 13 | 14 | 15C | 16 | 17 | 18 | 19 |
|---|---|---|---|---|---|---|---|---|---|
| TPV-1 | 100.0 | 100.0 | 100.0 | 100.0 | 100.0 g | 100.0 | 100.0 | 100.0 | 100.0 |
| SLP-0556 | 3.4 | 6.7 | 10.0 | 13.4 |  |  |  |  |  |
| SPL-0121 |  |  |  |  |  | 3.4 | 6.7 | 10.0 | 13.4 |
| Polypropylene:Plastomer Ratio | 100:25 | 100:50 | 100:75 | 100:100 | 100:0 | 100:25 | 100:50 | 100:75 | 100:00 |
| Plastomer concentration, wt. % | 3.2% | 6.3% | 9.1% | 11.8% | 0.0% | 3.2% | 6.3% | 9.1% | 11.8% |
| Physical Properties, Unaged |  |  |  |  |  |  |  |  |  |
| Hardness, Shore A | 61 | 60 | 59 | 59 | 60 | 61 | 60 | 59 | 58 |
| 50% Modulus, MPa | 1.69 | 1.73 | 1.66 | 1.70 | 1.68 | 1.71 | 1.65 | 1.66 | 1.63 |
| 100% Modulus, MPa | 2.36 | 2.39 | 2.32 | 2.33 | 2.37 | 2.37 | 2.30 | 2.29 | 2.26 |
| Tensile Strength, MPa | 7.10 | 8.27 | 8.90 | 9.86 | 5.90 | 6.61 | 7.10 | 7.06 | 8.50 |
| Ultimate Elongation % | 527 | 589 | 620 | 668 | 435 | 511 | 554 | 565 | 672 |
| Toughness, MJ/m$^3$ | 21.18 | 26.18 | 28.79 | 32.34 | 15.51 | 19.77 | 22.56 | 22.90 | 30.72 |
| % Tension Set 100% E, 10 min 21° C. | 8.0 | 7.5 | 7.5 | 7.5 | 7.5 | 7.5 | 7.5 | 8.5 | 7.5 |
| % Compression set 22 hrs. @ 100 C. | 27.2 | 28.7 | 28.5 | 29.0 | 25.0 | 26.7 | 29.7 | 28.5 | 31.7 |
| % Compression set 22 hrs. @ 21° C. | 14.8 | 14.4 | 13.6 | 14.0 | 14.1 | 14.6 | 14.8 | 13.5 | 12.9 |
| % Oil Swell, 24 hours, 125° C. | 119.7 | 121.2 | 118.6 | 116.4 | 95.6 | 115.1 | 118.3 | 115.3 | 109.9 |

TABLE IV

Physical Properties of a TPV and a Plastomer (random copolymer of ethylene and 1-octene)

|  | 20 | 21 | 22 | 23 | 24C | 25 |
|---|---|---|---|---|---|---|
| TPV-1 | 100.0 | 100.0 | 100.0 | 100.0 | 100.0 | 100.0 |
| Engage 8100 | 3.4 | 6.7 | 10.0 | 13.4 |  |  |
| Engage 8150 |  |  |  |  |  | 3.4 |
| Engage 8401 |  |  |  |  |  |  |
| Engage 8480 |  |  |  |  |  |  |
| Polypropylene:Plastomer Ratio | 100:25 | 100:50 | 100:75 | 100:100 | 100:0 | 100:25 |
| Physical Properties, Unaged |  |  |  |  |  |  |
| Hardness, Shore A | 59 | 57 | 56 | 55 | 62 | 61 |
| 50% Modulus, MPa | 1.66 | 1.50 | 1.47 | 1.45 | 1.69 | 1.61 |
| 100% Modulus, MPa | 2.29 | 2.12 | 2.06 | 2.04 | 2.37 | 2.26 |
| Tensile Strength, MPa | 5.32 | 5.34 | 5.83 | 6.14 | 5.45 | 5.94 |
| Ultimate Elongation % | 436 | 478 | 579 | 622 | 421 | 492 |
| Toughness, MJ/m$^3$ | 14.57 | 15.91 | 20.73 | 23.10 | 14.23 | 17.58 |
| % Tension set, 100% E, 10 min., 21° C. | 7.5 | 6.5 | 6.5 | 7.5 | 7.0 | 7.5 |
| % Compression set 22 hrs. @ 100 C. | 29.6 | 32.3 | 34.4 | 37.6 | 28.2 | 31.5 |
| Weight Gain |  |  |  |  |  |  |
| % Oil Swell 24 hrs @ 125 C. | 111.1 | 117.1 | 113.0 | 117.4 | 94.3 | 116.8 |

|  | 26 | 27 | 28 | 29 | 30 | 31C |
|---|---|---|---|---|---|---|
| TPV-1 | 100.0 | 100.0 | 100.0 | 100.0 | 100.0 | 100.0 |
| Engage 8100 |  |  |  |  |  |  |
| Engage 8150 | 13.4 |  |  |  |  |  |
| Engage 8401 |  | 3.4 | 13.4 |  |  |  |
| Engage 8480 |  |  |  | 3.4 | 13.4 |  |
| Polypropylene:Plastomer Ratio | 100:100 | 100:25 | 100:100 | 100:25 | 100:100 | 100:0 |

TABLE IV-continued

Physical Properties of a TPV and a Plastomer (random copolymer of ethylene and 1-octene)

Physical Properties, Unaged

| | | | | | | |
|---|---|---|---|---|---|---|
| Hardness, Shore A | 57 | 62 | 61 | 64 | 67 | 63 |
| 50% Modulus, MPa | 1.37 | 1.68 | 1.6 | 1.78 | 2.06 | 1.77 |
| 100% Modulus, MPa | 1.97 | 2.33 | 2.18 | 2.46 | 2.69 | 2.46 |
| Tensile Strength, MPa | 6.73 | 4.95 | 4.37 | 6.38 | 8.17 | 5.85 |
| Ultimate Elongation % | 636 | 404 | 450 | 500 | 627 | 453 |
| Toughness, MJ/m$^3$ | 24.30 | 12.84 | 13.53 | 19.13 | 29.2 | 16.34 |
| % Tension set 100% E, 10 min., 21° C. | 6.5 | 7.5 | 9.0 | 9.0 | 12.0 | 7.5 |
| % Compression set 22 hrs. @ 100 C. | 41.1 | 28.5 | 35.0 | 29.8 | 39.8 | 27.8 |
| Weight Gain | | | | | | |
| % Oil Swell 24 hrs @ 125 C. | 123.0 | 103.4 | 97.1 | 108.4 | 108.5 | 94.5 |

TABLE V

Physical Properties of Blends of a TPV with a Plastomer

| | 32C | 33 | 34 | 35 |
|---|---|---|---|---|
| TPV-2 | 100.0 g | 100.0 | 100.0 | 100.0 |
| Exact SLP-0566 | | 11.2 | 24.9 | 43.9 |
| Polypropylene:Plastomer Ratio | 100:0 | 100:19 | 100:43 | 100:74 |
| Physical Properties, Unaged | | | | |
| Hardness, Shore D | 55.5 | 52 | 52 | 49 |
| 50% Modulus, MPa | 15.07 | 13.31 | 11.81 | 10.86 |
| 100% Modulus, MPa | 14.51 | 12.93 | 11.60 | 10.84 |
| Tensile Strength, MPa | 16.86 | 20.66 | 20.77 | 22.32 |
| Ultimate Elongation % | 438 | 548 | 589 | 625 |
| Toughness, MJ/m$^3$ | 64.9 | 79.8 | 79.2 | 84.6 |
| % Tension set, 100% E, 10 min, 21° C. | 60.5 | 57.0 | 47.0 | 44.5 |

TABLE VI

Physical Properties of Blends of a TPV and a Plastomer (random copolymer of ethylene and 1-butene)

| | 36 | 37 | 38 |
|---|---|---|---|
| TPV-3 | 100.0 | 100.0 | 100.0 |
| Exact SLP-0566 | | 6.4 | 13.6 |
| Polypropylene:Plastomer Ratio | 100:0 | 100:68 | 100:144 |
| Physical Properties, Unaged | | | |
| Hardness, Shore A | 51 | 53 | 55 |
| 50% Modulus, MPa | 1.21 | 1.21 | 1.28 |
| 100% Modulus, MPa | 1.83 | 1.83 | 1.86 |
| Tensile Strength, MPa | 5.68 | 8.03 | 10.07 |
| Ultimate Elongation % | 471 | 609 | 690 |
| Toughness, MJ/m$^3$ | 15.15 | 24.83 | 31.10 |
| % Tension set, 100% E, 10 min. 21° C. | 6.5 | 6.5 | 6.5 |
| % Compression set 22 hrs. @ 100° C. | 25.4 | 28.8 | 32.5 |
| % Compression set 22 hrs @ 21° C. | 13.9 | 12.7 | 13.8 |
| % Oil Swell wt. gain, 24 hours, 125° C. | 79.8 | 112.2 | 135.0 |
| Tear Strength N/m$^2$ | 19.78 | 25.54 | 29.00 |

TABLE VII

Conventional Ethylene Copolymers

| EPDM/EPR Samples | C2 (wt. %) | ML (114) @ 125° C. | Mol. Wt. Dist. |
|---|---|---|---|
| Vistalon ™ 2504 | 52 | 26 | Broad |
| Vistalon ™ 8510 | 51 | 49 | Narrow |
| Vistalon ™ 606 | 48 | 65 | Broad |
| Vistalon ™ 7500 | 50 | 91 | Narrow/Tailored Ends |
| Vistalon ™ 808 | 77 | 46 | Medium |
| Vistalon ™ 4709 | 75 | 81 | |

Vistalon ™ is available from Exxon.

TABLE VIII

Physical Properties of Blends of TPV with Conventional Ethylene Copolymers

| | 39C (Avg) | 40C | 41C | 42C | 43C | 44C | 45C | 46C |
|---|---|---|---|---|---|---|---|---|
| TPV-1 | 100.0 | 100.0 | 100.0 | 100.0 | 100.0 | 100.0 | 100.0 | 100.0 |
| Vistalon ™ 7500 | | 3.4 | 13.4 | | | | | |
| Vistalon ™ 606 | | | | 3.4 | 13.4 | | | |
| Vistalon ™ 808 | | | | | | 3.4 | 13.4 | |
| Vistalon ™ 2504 | | | | | | | | 3.4 |
| Polypropylene:EPR Ratio | 100:0 | 100:25 | 100:100 | 100:25 | 100:100 | 100:25 | 100:100 | 100:25 |
| Physical Properties, Unaged | | | | | | | | |
| Hardness, Shore A | 62 | 57 | 48 | 57 | 45 | 62 | 60 | 58 |
| 50% Modulus, MPa | 1.72 | 1.47 | 1.01 | 1.46 | 0.93 | 1.64 | 1.55 | 1.46 |
| 100% Modulus, MPa | 2.40 | 2.07 | 1.41 | 2.06 | 1.23 | 2.31 | 2.14 | 2.06 |

TABLE VIII-continued

Physical Properties of Blends of TPV with Conventional Ethylene Copolymers

| | | | | | | | | |
|---|---|---|---|---|---|---|---|---|
| Tensile Strength, MPa | 5.56 | 3.93 | 2.19 | 4.30 | 1.91 | 6.26 | 7.03 | 4.00 |
| Ultimate Elongation % | 421 | 327 | 283 | 378 | 318 | 495 | 629 | 338 |
| Toughness, MJ/m$^3$ | 14.54 | 8.41 | 4.44 | 10.54 | 4.55 | 18.35 | 25.37 | 8.84 |
| % Tension Set, 100% E, 10 min, 21° C. | 8 | 7.5 | 8.0 | 7.5 | 10.0 | 8.5 | 9.0 | |
| % Tension Set, 100% E, 10 min, 25° C. | | | | | | | | 8.5 |
| % Compression set, 22 hrs. @ 100 C. | 25.9 | 28.5 | 39.2 | 27.6 | 42.4 | 25.5 | 31.6 | 30.2 |
| % Oil Swell, 24 hrs @ 125 C. | 97.38 | 119.2 | 153.1 | 124.9 | 154.4 | 115.4 | 134.6 | 117.1 |

| | | 47C | 48C | 49C | 50C | 51C |
|---|---|---|---|---|---|---|
| | TPV-1 | 100.0 | 100.0 | 100.0 | 100.0 | 100.0 |
| | Vistalon ™ 2504 | 13.4 | | | | |
| | Vistalon ™ 8510 | | 3.4 | 13.4 | | |
| | Vistalon ™ 4709 | | | | 3.4 | 13.4 |
| | Polypropylene:EPR Ratio | 100:100 | 100:25 | 100:100 | 100:25 | 100:100 |
| | Physical Properties, Unaged | | | | | |
| | Hardness, Shore A | 46 | 59 | 47 | 61 | 58 |
| | 50% Modulus, MPa | .92 | 1.48 | .98 | 1.59 | 1.45 |
| | 100% Modulus, MPa | 1.26 | 2.09 | 1.34 | 2.27 | 2.06 |
| | Tensile Strength, MPa | 1.87 | 4.34 | 1.95 | 6.92 | 9.50 |
| | Ultimate Elongation % | 258 | 374 | 257 | 526 | 655 |
| | Toughness, MJ/m$^3$ | 3.46 | 10.50 | 3.63 | 20.52 | 29.35 |
| | % Tension Set, 100% E, 10 min, 25° C. | 8.5 | 8.5 | 10.0 | 7.5 | 7.0 |
| | % Compression set, 22 hrs. @ 100 C. | 38.0 | 26.8 | 43.3 | 29.9 | 40.0 |
| | % Oil Swell, 24 hrs @ 125 C. | 136.3 | 120.3 | 143.6 | 122.0 | 140.5 |

TABLE IX

Physical Properties of Blends of a TPV and a Plastomer

| | 52C | 53 | 54 | 55C |
|---|---|---|---|---|
| TPV-1 | 100.0 | 100.0 | 100.0 | 100.0 |
| Exact SLP-0566 | | 13.3 before cure | 13.3 after cure | |
| Polypropylene:Plastomer Ratio | 100:0 | 100:100 | 100:100 | 100:0 |
| Physical Properties. Unaged | | | | |
| Hardness, Shore A | | 61 | 63 | 59 |
| 50% Modulus, MPa | 1.6 | 1.6 | 1.5 | 1.5 |
| 100% Modulus, MPa | 2.5 | 2.3 | 2.2 | 2.2 |
| Tensile Strength, MPa | 4.7 | 7.0 | 6.6 | 4.5 |
| Toughness, MJ/m$^3$ | 7.6 | 20.8 | 22.5 | 8.8 |
| Glumate Elongation, % | 265 | 504 | 567 | 311 |
| % Oil Swell, 24 hrs at 125 C. | 87.8 | 164.5 | 142.3 | 117.0 |
| % Compression Set, 22 hours @ 100° C. | 24.2 | 34.2 | 43.0 | 32.2 |
| % Compression Set, 22 hours @ 21° C. | 13.7 | 15.7 | 17.1 | 16.8 |
| Tear Strength N/m$^3$ | 18.65 | 30.99 | 30.36 | 21.61 |
| % Tension Set, 1100% E. 10 min. 21° C. | 5.5 | 7.0 | 6.5 | 6.5 |

TABLE X

Ethylene Copolymers

| Ethylene Copolymers | MI | Melting Temp. C. | Density | Polymer Catalyst |
|---|---|---|---|---|
| Exceed ™ 350D60 | 1 | 119 | 0.917 | Metallocene/single site catalyst |
| Escorene ™ LL1001 | 1 | 122 | 0.918 | Ziegler Nana/multiple site catalyst |
| Exceed ™ 377D60 | 1 | 120 | 0.922 | Metallocene/single site catalyst |
| Escorene ™ HD6706 Control | 7 | 130 | 0.952 | Ziegler Nana/multiple site catalyst |

TABLE XI

Physical Properties of Blends of TPV and Ethylene Copolymers

| | 56 | 57 | 58 | 59 | 60C | 61 | 62 | 63 | 64 |
|---|---|---|---|---|---|---|---|---|---|
| TPV-1 | 100.0 | 100.0 | 100.0 | 100.0 | 100.0 | 100.0 | 100.0 | 100.0 | 100.0 |
| Exceed ™ 350D60 | 3.4 | 6.7 | 10.0 | 13.4 | | | | | |
| Escorene ™ LL1001 | | | | | | 3.4 | 6.7 | 10.0 | 13.4 |
| Polypropylene:Ethylene Copolymer Ratio | 100:25 | 100:50 | 100:75 | 100:100 | 100:0 | 100:25 | 100:50 | 100:75 | 100:100 |

TABLE XI-continued

Physical Properties of Blends of TPV and Ethylene Copolymers

Physical Properties, Unaged

| | | | | | | | | | |
|---|---|---|---|---|---|---|---|---|---|
| Hardness, Shore A | 66 | 69 | 71 | 74 | 63 | 65 | 67 | 70 | 73 |
| 50% Modulus, MPa | 1.90 | 2.13 | 2.34 | 2.57 | 1.68 | 1.86 | 2.02 | 2.24 | 2.40 |
| 100% Modulus, MPa | 2.58 | 2.80 | 3.00 | 3.19 | 2.37 | 2.53 | 2.69 | 2.89 | 3.03 |
| Tensile Strength, MPa | 7.10 | 8.10 | 9.02 | 9.33 | 6.20 | 6.34 | 6.86 | 7.43 | 7.43 |
| Ultimate Elongation % | 529 | 581 | 613 | 623 | 481 | 492 | 517 | 567 | 568 |
| Toughness, MJ/m$^3$ | 21.9 | 26.7 | 30.7 | 32.4 | 17.8 | 19.0 | 21.5 | 25.4 | 26.18 |
| Tear Strength (N/m$^2$) | 25.76 | 28.88 | 32.95 | 36.53 | 21.84 | 25.32 | 27.21 | 30.74 | 32.77 |
| % Tension Set, 100% E, 10 min., 21° C. | 9.0 | 12.0 | 13.0 | 14.5 | 6.5 | 9.0 | 10.0 | 13.0 | 11.5 |
| % Compression set, 22 hrs @ 100° C. | 31.8 | 31.7 | 33.3 | 35.7 | 27.3 | 28.8 | 28.7 | 28.3 | 29.3 |
| % Compression set, 22 hrs. 21° C. | 16.2 | 17.6 | 17.6 | 17.9 | 14.5 | 15.9 | 18.4 | 18.8 | 18.6 |
| % Oil Swell, 24 hrs @ 125 C. | 116.4 | 123.9 | 119.0 | 113.7 | 96.3 | 114.0 | 126.2 | 174.0 | 117.5 |
| % Oil Swell, 24 hrs, 60° C. | 58.5 | 49.3 | 46.5 | 41.7 | 66.1 | 60.7 | 55.3 | 53.2 | 49.4 |

| | 65C | 66C | 67 | 68 | 69 | 70 |
|---|---|---|---|---|---|---|
| TPV-1 | 100.0 | 100.0 | 100.0 | 100.0 | 100.0 | 100.0 |
| Exceed ™ 377D60 | | | 3.4 | 6.7 | 10.0 | 13.4 |
| Polypropylene:Ethylene Copolymer Ratio | 100:0 | 100:0 | 100:25 | 100:50 | 100:75 | 100:100 |
| Physical Properties, Unaged | | | | | | |
| Hardness, Shore A | 64 | 63 | 66 | 69 | 73 | 74 |
| 50% Modulus, MPa | 1.72 | 1.69 | 1.90 | 2.15 | 2.45 | 2.68 |
| 100% Modulus, MPa | 2.40 | 2.37 | 2.57 | 2.82 | 3.10 | 3.31 |
| Tensile Strength, MPa | 5.70 | 6.02 | 6.88 | 8.03 | 8.87 | 9.70 |
| Ultimate Elongation % | 447 | 467 | 530 | 578 | 609 | 642 |
| Toughness, MJ/m$^3$ | 15.7 | 17.0 | 21.6 | 26.6 | 30.5 | 34.6 |
| Tear Strength (N/m$^2$) | 22.70 | 22.18 | 26.28 | 30.85 | 34.23 | 36.65 |
| % Tension Set, 100% E, 10 min., 21° C. | 7.5 | 7.5 | 9.5 | 12.5 | 13.0 | 15.5 |
| % Compression set, 22 hrs @ 100° C. | 27.8 | 27.7 | 28.9 | 32.4 | 31.3 | 32.0 |
| % Compression set, 22 hrs. 21° C. | 15.2 | 14.0 | 17.0 | 18.1 | 18.1 | 21.1 |
| % Oil Swell, 24 hrs @ 125 C. | 97.5 | 94.1 | 115.6 | 123.2 | 121.3 | 114.4 |
| % Oil Swell, 24 hrs, 60° C. | 65.3 | 63.1 | 61.3 | 53.2 | 48.4 | 43.3 |

TABLE XII

Comparison of Effects of Different Ethylene Copolymers on Physical Properties of a TPV Data from Table XI Samples Plus Extra Data

| | Ultimate Elongation % | | | | 100% Modulus, MPa | | | |
|---|---|---|---|---|---|---|---|---|
| Polypropylene:Ethylene Copolymer Ratio | 100:25 | 100:50 | 100:75 | 100:100 | 100:25 | 100:50 | 100:75 | 100:100 |
| PE Copolymer, parts per 100 parts TPV-1 | 3.4 | 6.7 | 10.0 | 13.4 | 3.4 | 6.7 | 10.0 | 13.4 |
| Exceed ™ 350D60 | 529 | 581 | 613 | 623 | 2.58 | 2.8 | 3 | 3.2 |
| Escorene ™ LL1001 | 492 | 517 | 567 | 568 | 2.53 | 2.69 | 2.89 | 3.04 |
| Escorene ™ HD6706 (Control) | 489 | 508 | 518 | 535 | 2.7 | 3.04 | 3.28 | 3.63 |
| Exceed ™ 377D60 | 530 | 578 | 609 | 642 | 2.57 | 2.82 | 3.1 | 3.31 |

TABLE XIII

Physical Properties of Blends of TPV and Plastomers where the TPV rubber is natural, nitrile rubber and butyl rubber

| | 71C | 72 | 73 | 74 | 75 | 76C | 77 | 78 | 79 |
|---|---|---|---|---|---|---|---|---|---|
| TPV-4 | 100.0 | 100.0 | 100.0 | 100.0 | 100.0 | | | | |
| TPV-5 | | | | | | 100.0 | 100.0 | 100.0 | 100.0 |
| TPV-6 | | | | | | | | | |
| Exact SLP-0121 | | 8.1 | 17.7 | | | | | | |
| Exact SLP-0566 | | | | 8.1 | 17.7 | | | | |
| Exact 4033 | | | | | | | 3.1 | 6.4 | 9.9 |
| Polypropylene:Plastomer Ratio | 100:0 | 100:84 | 100:18 | 100:84 | 100:18 | 100:0 | 100:21 | 100:43 | 100:66 |
| Physical Properties, Unaged | | | | | | | | | |
| Hardness, Shore A | 35 | 46 | 51 | 46 | 50 | 71 | 73 | 76 | 76 |
| 50% Modulus, MPa | 0.63 | 0.78 | 0.88 | 0.73 | 0.95 | 2.61 | 2.68 | 2.99 | 2.93 |

TABLE XIII-continued

Physical Properties of Blends of TPV and Plastomers where the TPV rubber is natural, nitrile rubber and butyl rubber

| 100% Modulus, MPa | 0.97 | 1.09 | 1.17 | 1.04 | 1.26 | 3.64 | 3.62 | 3.87 | 3.74 |
|---|---|---|---|---|---|---|---|---|---|
| Ultimate Tensile Strength, MPa | 2.58 | 3.83 | 4.25 | 4.55 | 5.65 | 6.14 | 6.34 | 7.02 | 7.01 |
| Ultimate Elongation, % | 278 | 420 | 507 | 491 | 559 | 224 | 245 | 273 | 285 |
| % Tension Set, 100% E, 10 min, 21° C. | 8.5 | 10 | 11 | 10 | 10 | 8.5 | 10 | 12.5 | 14 |

|  | 80 | 81C | 82 | 83 | 84 | 85 |
|---|---|---|---|---|---|---|
| TPV-4 |  |  |  |  |  |  |
| TPV-5 | 100.0 |  |  |  |  |  |
| TPV-6 |  | 100.0 | 100.0 | 100.0 | 100.0 | 100.0 |
| Exact SLP-0121 |  |  |  |  |  |  |
| Exact SLP-0566 |  |  |  |  |  |  |
| Exact 4033 | 13.6 |  | 3.1 | 6.4 | 9.9 | 13.6 |
| Polypropylene:Plastomer Ratio | 100:91 | 100:0 | 100:20 | 100:40 | 100:62 | 100:85 |
| Physical Properties, Unaged |  |  |  |  |  |  |
| Hardness, Shore A | 76 | 59 | 60 | 60 | 60 | 60 |
| 50% Modulus, MPa | 3.16 | 1.38 | 1.48 | 1.47 | 1.48 | 1.5 |
| 100% Modulus, MPa | 3.94 | 2.07 | 2.17 | 2.13 | 2.12 | 2.14 |
| Ultimate Tensile Strength, MPa | 7.54 | 5.91 | 6.53 | 6.55 | 7.09 | 7.7 |
| Ultimate Elongation, % | 307 | 343 | 366 | 376 | 410 | 444 |
| % Tension Set, 100% E, 10 min, 21° C. | 15 | 7 | 8 | 8.5 | 9 | 10 |

While in accordance with the patent statutes the best mode and preferred embodiment has been set forth, the scope of the invention is not limited thereto, but rather by the scope of the attached claims.

What is claimed is:

1. A thermoplastic vulcanizate composition, comprising:
   from about 20 to about 85 parts by weight rubber and from about 15 to about 80 parts by weight of semi-crystalline polypropylene wherein said parts by weight are based upon 100 parts by weight of said rubber and said polypropylene, and
   a thermoplastic random ethylene copolymer having a peak melting temperature from about 55 to about 100° C.,
   wherein the weight ratio of said polypropylene to said random ethylene copolymer is from about 100:5 to 100:150 and wherein said random ethylene copolymer comprises from about 70 to about 95 weight percent repeat units from ethylene and from about 5 to about 30 weight percent of repeat units from one or more other ethylenically unsaturated monomers based upon the weight of said random ethylene copolymer,
   wherein said rubber comprises an ethylene-propylene-diene rubber, natural rubber, butyl rubber, halobutyl rubber, halogenated rubber copolymer of p-alkylstyrene and at least one isomonoolefin having 4 to 7 carbon atoms, a rubber homopolymer of a conjugated diene having from 4 to 8 carbon atoms, or a rubber copolymer having at least 50 weight percent repeat units from at least one conjugated diene having from 4 to 8 carbon atoms or combinations thereof,
   and wherein said thermoplastic vulcanizate composition has a tension set of about 50% or less as determined by ASTM D412.

2. A composition according to claim 1, wherein said rubber was dynamically vulcanized in the presence of at least said semi-crystalline polypropylene thereby forming said thermoplastic vulcanizate.

3. A composition according to claim 1, wherein said random ethylene copolymer comprises from about 70 to about 90 weight percent repeat units from ethylene and from about 10 to about 30 weight percent repeat units from at least one monoolefin having from 3 to 8 carbon atoms.

4. A composition according to claim 1, wherein said peak melting temperature is from about 55 to about 90° C.

5. A composition according to claim 4 wherein said random ethylene copolymer comprises from about 70 to about 90 weight percent repeat units from ethylene and from about 10 to about 30 weight percent repeat units from at least one monoolefin having from 3 to 8 carbon atoms.

6. A composition according to claim 5, wherein said random ethylene copolymer comprises from about 65 to about 85 weight percent repeat units from ethylene and from about 15 to about 25 weight percent repeats units from at least one monoolefin having from 3 to 8 carbon atoms.

7. A composition according to claim 1, wherein said rubber comprises ethylene-propylene-diene rubber.

8. A composition according to claim 1, wherein said rubber comprises butyl rubber, halobutyl rubber, or a halogenated rubber copolymer of p-alkylstyrene and isobutylene.

9. A composition according to claim 1, wherein said rubber comprises natural rubber.

10. A composition according to claim 1, wherein said rubber comprises a rubber homopolymer of a conjugated diene having from 4 to 8 carbon atoms or a rubber copolymer having at least 50 weight percent repeat units from at least one conjugated diene having from 4 to 8 carbon atoms or combinations thereof.

11. A process for making a thermoplastic vulcanizate composition, comprising:
   blending from about 20 to about 85 parts by weight rubber and from about 15 to about 80 parts by weight of a semi-crystalline polypropylene wherein said parts by weight are based upon 100 parts by weight of said rubber and said semi-crystalline polypropylene, and a thermoplastic random ethylene copolymer, having a peak melting temperature from about 55 to about 100° C., wherein the weight ratio of said polypropylene to said random ethylene copolymer is from about 100:5 to 100:150 and wherein said random ethylene copolymer comprises from about 70 to about 95 weight percent repeat units from ethylene and from about 5 to about 30 weight percent of repeat units from one or more other ethylenically unsaturated monomers based upon the weight of said random ethylene copolymer, and dynamically vulcanizing said rubber after blending with said semi-crystalline polypropylene, or said random ethylene copolymer, or combinations thereof, to provide a thermoplastic vulcanizate composition having a tension set of about 50% or less as determined by ASTM D412.

12. A process according to claim 11, wherein said random ethylene copolymer has a peak melting temperature from about 55 to about 90° C.

13. A process according to claim 11, wherein said thermoplastic ethylene copolymer is added and blended after said rubber is vulcanized.

* * * * *